June 17, 1969  C. PROST-DAME ET AL  3,449,864
DOOR LOCKING AND SEALING DEVICES
Filed May 19, 1967  Sheet 1 of 2
FIG. 1 FIG. 2 FIG. 3
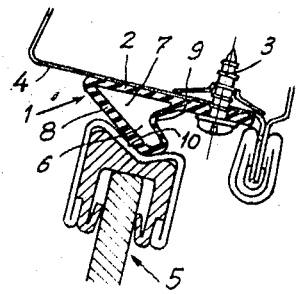
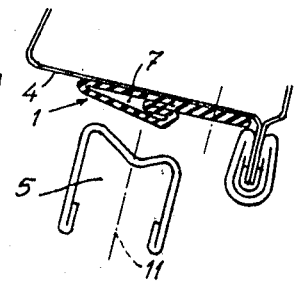
FIG. 5
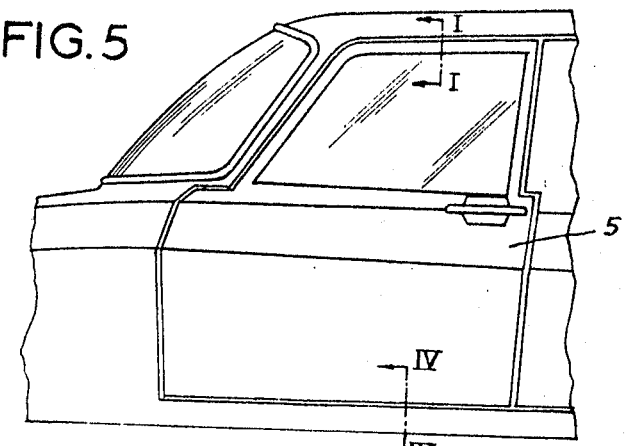
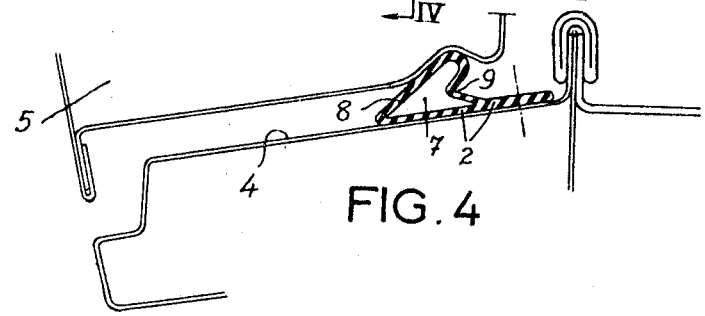
FIG. 4
FIG. 6  FIG. 7  FIG. 8
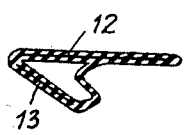
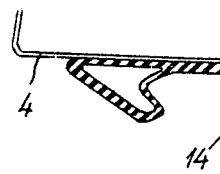
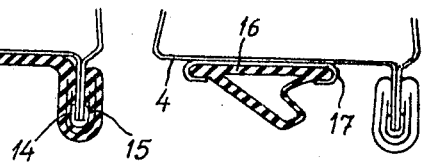

United States Patent Office 3,449,864
Patented June 17, 1969

3,449,864
DOOR LOCKING AND SEALING DEVICES
Claude Prost-Dame, Pierre Ventre, and Pierre Bouthors, Billancourt, France, assignors to Regie Nationale des Usines Renault, Billancourt, France
Filed May 19, 1967, Ser. No. 639,774
Claims priority, application France, July 1, 1966, 67,916
Int. Cl. E06b 7/23; F16j 15/46
U.S. Cl. 49—477
6 Claims

ABSTRACT OF THE DISCLOSURE

Device for locking and sealing a movable panel adapted to fit in a frame, characterised by a flexible fluid-tight strip mounted on one of these two elements and connected through at least one three-way control cock to a source of fluid under pressure and to a source of fluid under vacuum, said strip comprising a collapsible hollow bead projecting sufficiently when neither under pressure nor under vacuum to engage in the closed position a groove formed in the other element, and of which the concave contour is directed in a direction substantially parallel to the plane of the movable panel in its closed position. (Refer to FIGURE 1.)

---

The present invention relates to means for locking doors fitting in a relatively fixed door frame and also for making the joint between the door and frame fluid-tight.

As this invention is applicable to all sealing devices requiring the mutual locking and sealing of a movable panel in a relatively fixed door frame, it is obviously and advantageously applicable to doors of automotive vehicles.

The locking and sealing system according to this invention, which is designed for mutually locking and sealing two closing members consisting the one of a movable panel and the other of a relatively fixed frame structure, the former fitting into the latter, is characterised according to this invention by a fluid-tight flexible hollow weatherstrip mounted on one of said closing members and having its hollow interior connected through the medium of at least one three-way control cock to a source of fluid under pressure and to a source of vacuumized fluid. The contour of this weatherstrip comprises a hollow collapsible portion projecting sufficiently when neither under pressure nor under vacuum to engage, in the closed door position, a groove formed in the other member and thus hold the door in said closed position (safety catch). The concave contour of said groove is disposed in a direction substantially parallel to the plane of the movable panel in the closed position thereof.

Advantageously, in order to facilitate the collapse or flattening of the projecting hollow portion of the weatherstrip in its vacuumized condition, an in-turned elbow is formed in a portion of its contour which is disposed laterally with respect to the direction in which said projecting hollow portion is adapted to collapse.

A typical form of embodiment of the device of this invention will now be described with reference to the attached drawing, in which:

FIGURES 1 to 4 inclusive are diagrammatic cross-sectional views showing during various phases of its operation a weatherstrip fitted to the door of an automotive vehicle, the sections of FIGURES 1 to 3 inclusive corresponding to lines I—I of FIGURE 5, and that of the weatherstrip of FIGURE 4 to the line IV—IV of FIGURE 5;

FIGURE 5 illustrates the door of which the top edge FIGURES 1 to 3 of the drawing.

FIGURES 6 to 8 are cross-sectional views of three modified forms of embodiment of the weatherstrip and FIGURE 9 is a diagram illustrating the weatherstrip and door assembly and the system for pneumatically controlling same.

Figure 9:
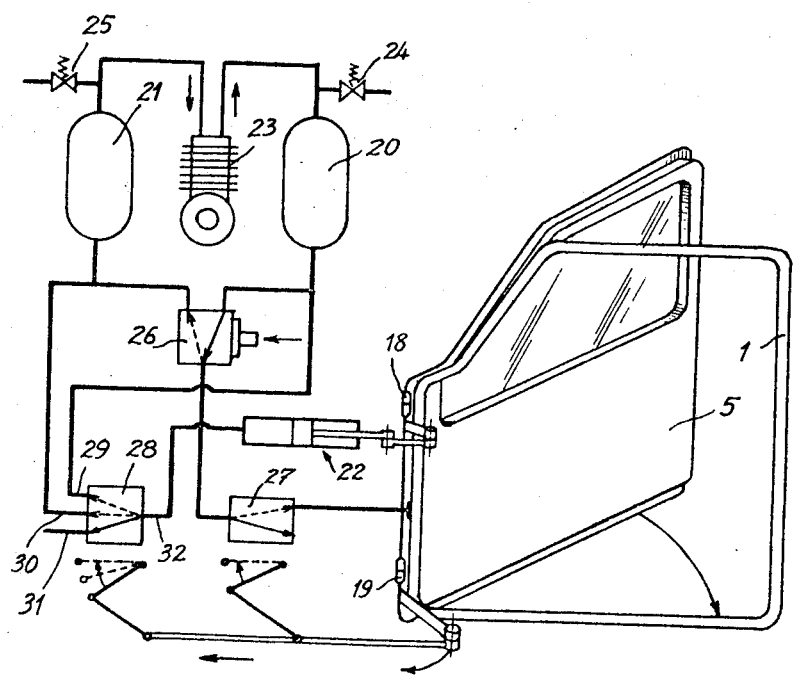

Referring first to FIGURE 1 the weatherstrip 1 according to this invention is moulded or extruded from flexible elastomer such as rubber or plastic and comprises a fastening lip 2 secured by screws 3 to the inner face of the fixed frame 4 of a door 5. This lip 2 is formed integrally with a flexible hollow sealed bead 6 constituting a chamber 7 similar to the inner space of a tire-tube, this chamber 7 being bound by said lip 2, a slant wall 8 and a lateral concave or inwardly folded wall 9. This chamber 7 is connected by suitable pipe lines to a device (not shown) adapted to either supply compressed air to, or vacuumize, said chamber 7, at will.

A groove 10 corresponding substantially in shape to the top of said bead 6 is so formed in the outer peripheral portion of the door 5 which is to fit into the relatively fixed frame 4 that when neither under pressure nor under vacuum said bead engages said groove when the door is closed. The concave contour of groove 10 is therefore directed in a direction substantially parallel to the plane 11 of door 5 shown in chain-dotted line in FIGURE 3.

Of course, the weatherstrip of this invention may be mounted on only three sides of the door, the fourth side being provided with a conventional weatherstrip.

The operation of this device is clearly apparent from FIGURES 1 to 3 of the drawing.

To close the door 5, the chamber 7 of weatherstrip 1 is connected to the atmosphere, so that the door can be closed until it engages its stops (not shown), the shape of the hollow bead 6 being slightly altered before it actually fits in the groove 10.

The locking action is obtained by introducing fluid under pressure into the tube-like chamber 7, whereby the door is firmly held in all directions (FIGURE 2).

Finally, to release the door, it is only necessary to produce a vacuum in chamber 7 and the bead 5 will collapse or flatten down, as shown in FIGURE 3.

FIGURES 6 to 8 illustrate modified forms of embodiment of the locking and sealing device of this invention.

The weatherstrip shown in FIGURE 6 comprises reinforcing flat strips 12 and 13 solid with the fastening lip 2 and the slant wall 8. If desired, these flat strips 12 and 13 may consist of metal, rigid plastic or fabric and may be either embedded in the weatherstrip material or secured by bonding, gluing, cementing or fusion to the surface of the parts to be reinforced.

The inner end of the lip 2 of the weatherstrip illustrated in FIGURE 7 comprises a channel portion 14 having embedded therein a resilient channel section 15 of metal, plastic or othe rsuitable material. This channel section 14 is adapted tightly to receive a rib 16 consisting of the assembly edges of bodywork elements forming part of the fixed door frame, so as to hold the weatherstrip in position by resilient clamping action.

The base 16 of the weatherstrip illustrated in FIGURE 8 is fitted in a metal section 17 having a C-shaped cross-sectional contour, as shown, which is secured by means of screws or by welding to the inner face of the fixed door frame 4.

This invention is also concerned with the various possible forms of embodiment of the locking and sealing system illustrated diagrammatically in FIGURE 9. A door 5 of an automotive vehicle (seen from the interior of the passenger's compartment) is mounted on hinges 18, 19 and fits in its closed position in a hollow weatherstrip 1 mounted in the relatively fixed door frame (not shown).

A first reservoir 20 containing compressed air and a second vacuum reservoir 21 control the closing of door 5 and also the pneumatic locking, unlocking and opening thereof. The last phase of the closing movement and the first phase of the opening movement are controlled by means of a piston-and-cylinder unit or pneumatic actuator 22 having its piston rod pivotally connected to one end of a lever rigid with the door.

The first reservoir 20 containing compressed air is connected to the delivery port and the second reservoir 21 to the suction port of a compressor 23 having calibrated valves 24, 25 adapted to keep the pressure and vacuum to substantially constant values in the relevant reservoirs.

This compressor 23 may be driven in any suitable and known manner, for example from the power unit of the automotive vehicle or from a separate motor. The drive thereof is adapted to be discontinued or restored under the control of pressure-responsive elements, that is, elements responsive to the pressure and vacuum prevailing in these reservoirs respectively.

The system further comprises on the one hand a three-way weatherstrip control cock 26 having two selection ways and push-button control, and on the other hand a stop valve 27 having its control member operatively connected to the door 5 so as to be responsive to the movements thereof, and eventually a four-way actuator control cock 28 having three selection ways, this cock being also responsive to the movements of door 5.

The first reservoir 20 is connected to that one of the two selection ways of cock 26 which is open when the push-button is not depressed; the second reservoir 21 is connected to the way adapted to be opened when said push-button is depressed, the third way of cock 26 being connected to the tube-like chamber 7 of weatherstrip 1 through the medium of the stop-valve 27 which is closed when the door 5 is open. Therefore, the circuit supplying the weatherstrip 1 is under pressure when the push-button is released.

The four-way cock 28 controlling the actuator 22 comprises a first selection way 29 connected to the first reservoir 20 and open when the door is fully closed, a second selection way 30 connected to the second reservoir 21 and open when the door is ajar, a third selection way 31 communicating with the atmosphere, and a fourth way 32 connected to said actuator 22 and open when the door is fully open.

The above-described arrangement operates as follows:

When the door is closed, the weatherstrip 1 is connected through the cock 26 and valve 27 to the first reservoir 20 under pressure so as to lock the door in its fixed frame. As the actuator 22 communicates through the four-way cock 28 with the reservoir 20 it urges the door to its open position.

When the push-button of cock 26 is depressed, the weatherstrip is vacuumized, so as to collapse and free the door which is opened by the actuator to the extent of, say, two to four inches. The door opening movement is completed manually, as usual. During its opening movement the door has closed the valve 27 and actuated the cock 28 to vent the actuator 22 to the atmosphere.

In the opposite direction, that is, to close the door, the first approach movement is done manually, for example to leave a gap of two to four inches, whereafter the door itself will move the control member of valve 28 to connect the actuator 22 to the vacuum reservoir 21, the piston of actuator 22 thus moving the door to its closed position in the door frame.

As it reaches the closed position the door actuates the stop valve 27, whereby the weatherstrip chamber 7 will be connected to the pressure reservoir 20 to lock the door in its closed position.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A device for mutually locking and sealing two closing members consisting the one of a movable panel and the other of a fixed frame, said members being adapted to fit one into the other, characterised in that said device comprises a hollow flexible fluid-tight strip mounted on one of said members and being adapted to be connected through the medium of at least one three-way control cock either to a source of fluid under pressure or to a vacuum source or to neither, said strip comprising a collapsible hollow bead projecting sufficiently in one position thereof in which it does not communicate with said sources to engage a concave groove formed in the other member in the closed position of said members and to hold the panel against movement, the concave contour of said groove being directed in a direction substantially parallel to the plane of the movable panel in its closed position, said bead being expandable into an extended position pursuant to being connected to a source of pressurized fluid whereby said bead locks the said members relative to each other and said bead being collapsible into a retracted position away from one of said members pursuant to its being connected to a vacuum source whereby said bead permits freedom of movement of said members relative to each other.

2. Locking and sealing device according to claim 1, characterised in that said strip comprises a longitudinal convex fold disposed laterally in relation to the direction in which said collapsible hollow bead can collapse.

3. Locking and sealing device according to claim 2, characterised in that said strip comprises a fastening lip or base.

4. Locking and sealing device according to claim 3, characterised in that the material constituting said strip is reinforced by stiffening flat strips solid therewith, or embedded therein.

5. Locking and sealing device according to claim 1, characterised in that the movable panel is the door of an automotive vehicle, that said door comprises said groove on its outer periphery, and that said strip is secured in the door frame.

6. Locking and sealing device according to claim 5, characterised in that the source of fluid under pressure consists of a first reservoir and the source of fluid under vacuum by a second reservoir, said reservoirs being connected respectively to the delivery and suction ports of a compressor and to the two selection ways of a three-way cock of the fugitive-action type, of which the third way communicates through the medium of a stop valve with said hollow strip, that a pneumatic actuator, so mounted that under pressure it will urge the door in the opening direction and under vacuum it will urge the door in the closing direction, is connected to the fourth way of a four-way cock having its three selection ways connected the first one to said first reservoir, the second one to said second reservoir and the third one to the atmosphere, the members controlling said four-way cock and said stop-valve being so connected to the door that in the closed position of said door said stop-valve is open and the fourth way of said four-way cock is connected to the first one, and that in the open position said stop-valve is closed and said fourth way is connected to the atmosphere, said fourth way being connected to said second way in the intermediate position of said door.

References Cited

UNITED STATES PATENTS

| | | | |
|---|---|---|---|
| 2,003,614 | 6/1935 | Shetzline | 49—477 X |
| 2,306,990 | 12/1942 | Essl | 49—477 X |
| 2,469,131 | 5/1949 | Ross | 49—477 |
| 2,507,360 | 5/1950 | Wicks | 49—477 X |
| 2,763,038 | 9/1956 | Hagerty et al. | 49—477 X |
| 2,908,948 | 10/1959 | Jones | 49—303 |
| 3,110,065 | 11/1963 | Denms | 49—477 |
| 3,284,955 | 11/1966 | Schroth | 49—477 |

DAVID J. WILLIAMOWSKY, *Primary Examiner.*

P. C. KANNAN, *Assistant Examiner.*

U.S. Cl. X.R.

277—34, 226